March 15, 1966
A. BLUMENSTOCK
3,241,054
ALTERNATING CURRENT VOLTAGE REGULATOR
UTILIZING MAGNETIC AMPLIFIER CIRCUITS
Filed Aug. 21, 1962
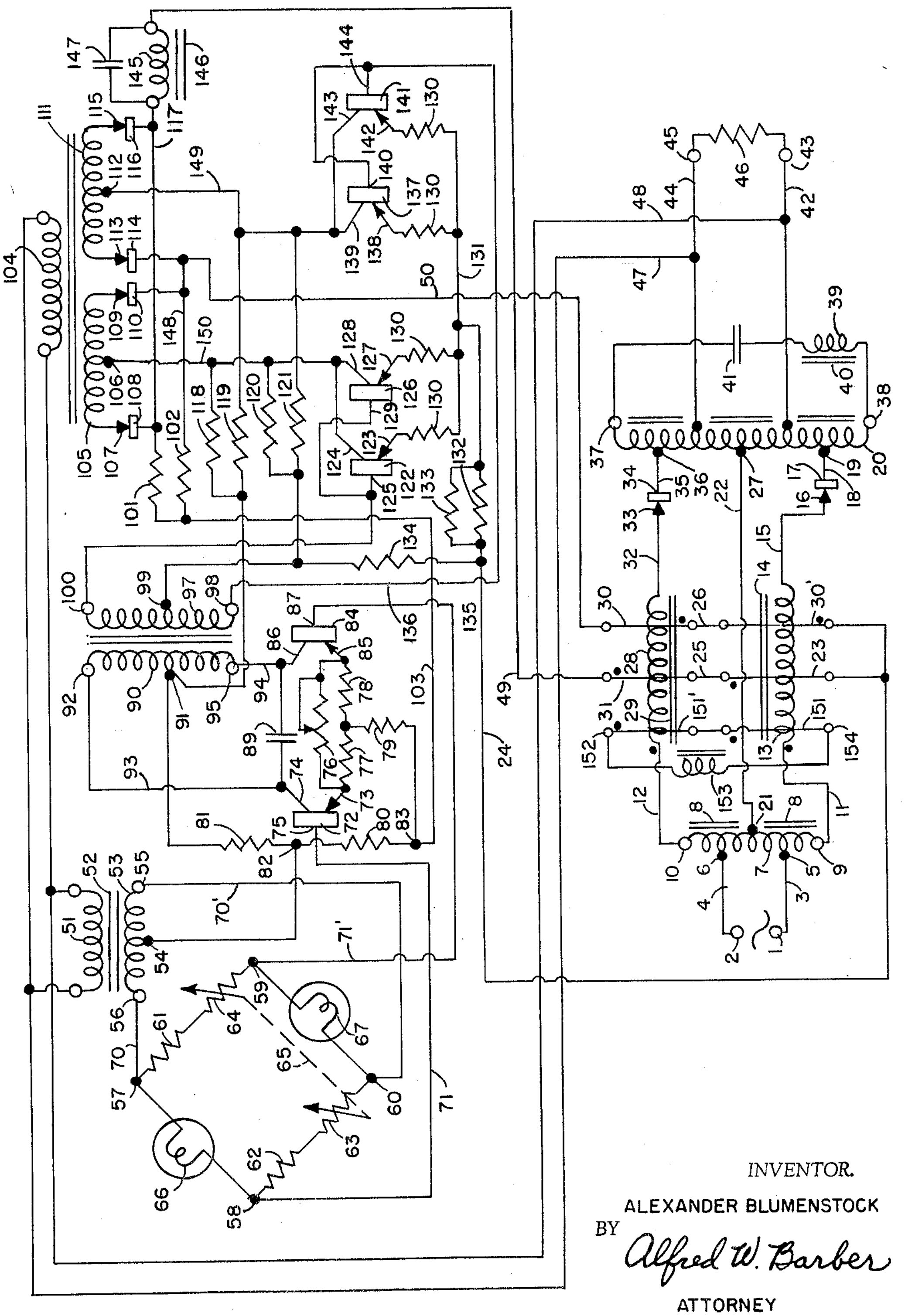
INVENTOR.
ALEXANDER BLUMENSTOCK
BY *Alfred W. Barber*
ATTORNEY 3,241,054

ALTERNATING CURRENT VOLTAGE REGULATOR UTILIZING MAGNETIC AMPLIFIER CIRCUITS

Alexander Blumenstock, Valley Stream, N.Y., assignor to Forbro Design Corp., New York, N.Y.
Filed Aug. 21, 1962, Ser. No. 218,266
7 Claims. (Cl. 323—89)

The present invention concerns alternating current voltage regulators and, in particular, magnetic amplifier controlled alternating current regulators.

Alternating current power sources available for use such as in powering electronic devices are typically subject to disturbing fluctuations in voltage. These fluctuations are due to varying loads on the power lines and are generally of the order of not more than plus or minus 10 percent. There may also be some variation in the frequency of the alternating current. Since many electronic devices and other machines require reasonably constant voltage for their proper operation, it is common practice to use alternating current voltage regulators where required.

The ideal alternating current voltage regulator would include the characteristics of instantaneous regulation, no harmonic generation and unvarying operation in the presence of changes in frequency of the current. Magnetic amplifier controlled devices have been used in the past to accomplish this voltage regulation of an alternating current but no such device has been provided having the ideal characteristics set forth above. Some of the hitherto available devices generate considerable harmonic distortion, others require the time of many cycles for full correction, and still others are sensitive to frequency while some have two or more of these undesirable characteristics.

The present invention concerns a magnetic amplifier controlled alternating current voltage regulator which comes closer to the above ideal than any hitherto available regulator. Briefly, the regulator according to the present invention utilizes a bridge circuit for error sensing with a vary fast response non-linear element in the form of a lamp having very low thermal inertia. The response of this bridge circuit is such that it will follow voltage changes considerably faster than the frequency of the alternating current to be regulated. Following the bridge a transistor amplifier is utilized having a fast response and reducing the gain requirements of the magnetic amplifier which it drives. There is no filtering in the amplifier circuit to slow down the response. The magnetic amplifier itself is divided and connected in such a manner as to prevent the circulating currents of the usual "doubler" circuit from flowing and thereby greatly decreasing its response time. Also, since the transistor amplifier is used, the magnetic amplifier gain may be low again decreasing its response time to less than the period of one cycle of the alternating current being controlled. Harmonics in the output of the regulator are reduced below those usually found in devices of this kind by tuning the output transformer of the magnetic amplifier to the fundamental frequency of the A.C. supply current and by series tuning shunt circuit across this output transformer to the third harmonic of the supply current.

Accordingly one object of the present invention is to provide methods of and means for voltage stabilization of alternating current power utilizing magnetic amplifiers which operate faster than devices hitherto available.

Another object is to provide an alternating current voltage regulator which has a low harmonic distortion content in its output.

Still another object is to provide an alternating current regulator which is insensitive to variations in the frequency of the power source.

A further object is to provide an alternating current voltage regulator having the above advantages which is also basically simple in concept and inexpensive to build.

A still further object is to provide a transistor amplifier supplied with synchronous pulsed power to minimize power dissipation.

Another object is to provide a transistor amplifier in the control circuit having sufficient gain to permit reducing the gain of the magnetic amplifier below 100 and thereby permitting its response time to be less than the period of one cycle of the power line frequency.

Still another object is to so decouple the two halves of the magnetic amplifier as to prevent direct circulating currents which would slow its operation.

These and other objects will be apparent to those skilled in the art from the detailed description of the invention given in connection with the figure of the drawing.

The figure of the drawing is a schematic circuit diagram of the preferred form of the present invention.

Briefly the invention includes an input auto transformer for coupling an input from a power line through a magnetic control amplifier to an output auto transformer. The magnetic control amplifier includes two reactor circuits, one in series with each of two leads between these input and output transformers. The output transformer is connected to supply the output load. The output transformer also supplies power to a transformer which in turn powers the transistor amplifiers and magnetic amplifier. Variations in the output voltage are detected by a bridge having two non-linear arms and coupled to the output terminals of the output transformer by means of a fourth transformer. The two non-linear bridge arms consist in voltage sensitive elements having very low thermal inertia and hence very fast response. The other two arms of the bridge are made adjustable so that the bridge can be accurately balanced at a predetermined output from the regular system. If this output voltage changes due to power line changes or due to load impedance changes, the non-linear arms change impedance causing an output of error signal to appear across one of the bridge diagonals. This error signal is amplified in a transistor amplifier consisting of a balanced voltage or current gain stage and a balanced power stage. The power stage feeds current differentially to the magnetic amplifier control windings in such a way as to cause the magnetic amplifier to provide a correction to the output voltage of the regulator system and restore balance to the bridge. The operating voltages to the transistor amplifier are supplied from the third transformer mentioned above and through rectifiers so that unidirectional synchronous power pulses are supplied to the amplifier and to the magnetic amplifier control windings. These latter circuits can be considered as a form of demodulator. By not using steady direct current on these amplifiers, the duty cycle is reduced and the power dissipation and heating of the transistors is greatly reduced. One side of the transistor power amplifier is phased to provide aiding control current to the magnetic amplifier tending to increase the output voltage of the system while the other side of the balanced transistor power amplifier is phased to provide opposing control current to the magnetic amplifier tending to decrease the output voltage of the system. With the aiding and opposing currents equal at the average mean output the magnetic amplifier control system has a range of control for over or under voltage or load conditions. The two halves of the magnetic amplifier are placed in separate leads between the input and output transformers so that current due to collapse of the magnetic field formed by forward conduction current is dissipated through the reflected output load rather than circulated through the other coil. This mode of operation has been found to considerably speed up the response of the magnetic amplifier. An inductor coupled to the magnetic amplifier increases the stability of the system. One advantage of the demodulator system as set forth above is that since conduction takes place on alternating half cycles, the power transistor need not be matched for optimum operation.

In the figure of the drawing terminals 1 and 2 are provided for connection to the alternating current power line source to be regulated. Power from these terminals in applied over lines 3 and 4 to taps 5 and 6 on the input auto transformer 7. Power from transformer 7 is applied to output auto transformer 20 from terminals 9, 10 and 21 through the magnetic amplifier circuits to terminals 19, 36 and 27 respectively. The circuit from terminal 9 to terminal 19 passes over lead 11, through magnetic amplifier coil 13, over lead 15 from rectifier anode 16 to rectifier cathode 17 and over lead 18. The impedance of this circuit from terminal 9 to terminal 19 is controlled for the half cycle of input power during which terminal 9 is positive with respect to terminal 21 by the magnetic amplifier coil 13 as will be set forth in more detail below. Terminal 21 is connected directly to terminal 27 over lead 22. Terminal 10 is coupled to terminal 36 by a series circuit passing over lead 12, through magnetic amplifier coil 28, over lead 32, from rectifier anode 33 to cathode 34 and over lead 35. The impedance of this circuit from terminal 10 to terminal 36 is controlled for the half cycle of input power during which terminal 10 is positive with respect to terminal 21 by the magnetic amplifier coil 28 as will be set forth in more detail below. In this way power controlled during each half cycle by the magnetic amplifier is applied to the output transformer 20 and power is applied to output terminals, 43–45 over leads 42 and 44 from taps on output transformer 20. In order to suppress third harmonic current in the output, capacitor 41 in series with inductor 39–40 is connected across output transformer 20 and are of such values as to parallel tune output transformer 20 to the fundamental frequency of the A.C. supply and to form a series tuned shunt resonating at the third harmonic of the supply frequency.

The output voltage is monitored by a four terminal bridge including two non-linear arms. This bridge comprises the four terminals 57, 59, 60 and 58 with arms consisting of resistors 61, 62, 63 and 64 and non-linear arms 66 and 67. Resistor 61 in series with adjustable resistor 64 is connected between points 57 and 59; non-linear arm 67 is connected between points 59 and 60, resistor 62 in series with adjustable resistor 63 is connected between points 58 and 60; and non-linear arm 66 is connected between points 58 and 57. The monitoring input signal is applied between points 57 and 60 from secondary 53 of transformer 51–52–53 by connections 70 and 70′ to terminals 55 and 56. Primary 51 is connected across the output loads 42–44 by means of leads 47 and 48 so that an alternating current voltage which is proportional to the output voltage is applied to bridge terminals 57 and 60. This bridge will be balanced so that no output signal appears across terminals 58 and 59 when the impedance of non-linear arm 66 equals the impedance of resistor 61 plus resistor 64 and the impedance of non-linear arm 67 equals the impedance of resistor 62 plus resistor 63. It has been found according to the present invention that lamps requiring very low operating current and having very low thermal inertia are suitable as arms 66 and 67. Suitable lamps will follow an alternating current up to frequencies of the order of 1000 cycles, far above the power frequencies contemplated here. At any given voltage across these lamps they will have a certain impedance and if the voltage is changed their impedances will change. Thus, if the bridge is balanced with the output voltage equal to the predetermined voltage at which it is to be regulated by varying resistors 63 and 64, the bridge will become unbalanced if the output voltage changes due to the change in lamp impedance. Resistors 63 and 64 may be ganged as indicated to facilitate the balancing adjustment. Thus, the bridge may be balanced for the predetermined output voltage and no output or error signal will appear between terminals 58 and 59, but an output signal will appear if the output voltage departs from its predetermined value.

The bridge output terminals 58 and 59 are connected to bases 75 and 87 respectively of the balanced amplifier transistors 72 and 84 over leads 71 and 71′ respectively so that the unbalance signals from the bridge are applied to the transistor amplifier. The balanced amplifier transistors 72 and 84 include bases 75 and 87, emitters 73 and 85 and collectors 74 and 86 respectively. These transistors are connected to a balanced circuit including equal emitter resistors 77 and 78 shunted by an adjustable equalizing resistor 76, a common emitter resistor 79 returning to a junction point 83. Collectors 74 and 86 are connected to the primary 90 of the interstage transformer 90–97 by means of leads 93 and 94 going to terminals 92 and 95 respectively. Transformer 104–105–111 supplies pulsating operating potentials to the transistor amplifiers in synchronism with the signals to be amplified since it is connected to the same source of power, this output transformer 20. Primary 104 is connected across the load leads 42 and 44 by means of leads 47 and 48 so that alternating current in phase with the load current is induced in secondaries 105 and 111. An instantaneous pulse of operating potential for transistors 72 and 84 will be such that collector transformer midtap 91 will be negative with respect to emitter return junction 83 for PNP transistors. (This and all the following polarity descriptions would be reversed for NPN transistors.) On one half of the output alternating current cycle secondary winding 105 will carry current in a direction which makes anode 107 positive with respect to mid-point 106. This positive polarity will cause rectifier 107–108 to conduct and a circuit will be established through resistor 101 and over lead 103 to junction point 83. The other side of the circuit will accordingly be negative and completed from point 106 through resistor 118 to collector circuit point 91. During the next half cycle anode 109 will be positive with respect to point 106 and a circuit will be established due to conduction of diode 109–110 over lead 148, through resistor 102, over lead 103 to junction point 83 on the positive side and from point 106 through resistor 118 to point 91 on the negative side again making collector circuit point 91 negative with respect to emitter return junction point 83. Operating base bias is also intermittently established by the connection of point 54 of the bridge input transformer to junction 82 between resistors 81 and 80 connected from negative point 91 to common junction 83. Thus balanced amplifier transistors 72 and 84 are energized and amplified error signals from the bridge are provided across primary 90. Similar circuits are associated with secondary 111 so that when rectifier 113–114 conducts a circuit is established over lead 148, through resistor 102, over lead 103 to junction point 83 and from point 112 through resistor 119 to point 91; and when rectifier 115–116 is conducting through resistor 101, over lead 103 to junction point 83 and from point 112 as above and all providing the same instantaneous polarities as set forth just above.

The transformer windings 105 and 111 through the associated rectifiers also supply pulsed power to the power transistors 122, 126, 137 and 141. These transistors are shown as two sets of parallel connected pairs although whether one or several transistors are used on each side of the circuit will depend on the power handling capacity of the particular transistors used and the power required to be fed into the magnetic amplifier. As shown, two transistors are used on each side of the circuit. Transistors 122 and 126 are connected in parallel with collector 124 connected to collector 128 and base 125 connected to base 129 and emitters 123 and 127 returned through similar resistors 130 to a common return lead 131. Similarly transistors 137 and 141 are connected in parallel with collector 139 connected to collector 143, base 140 connected to base 144 and emitters 138 and 142 returned through similar resistors 130 to common return lead 131. Operating potentials (pulsed) from windings 105 and 111 are developed through rectifiers 109–110 and 113–114 to lead 50 and through rectifiers 107–108 and 115–116 to lead 117 whereby these two leads will be positive with respect to the winding center taps 106 and 112. These points (106 and 112) being negative pulses are connected over leads 150 and 149 to collectors 124–128 and 139–143 respectively. The reference bias is supplied to bases 125–129 and 140–144 by returning the center tap 99 of secondary 97 to a voltage divider made up of resistors 120 going to lead 150 and 121 going to lead 149 and resistor 134 going to the junction between parallel connected resistors 132–133 returned to lead 131. It will be seen that each pair of power transistors is connected in series with a control winding of the magnetic amplifier. Transistors 122 and 126 are connected in series with control windings 30 and 30′ over connecting leads 26, 50, 24 and 150 so that current pulses are supplied to these windings in accordance with amplified signal pulses applied to bases 125–129 from transformer secondary 97 at end point 100. These transistors (125–129) due to the connections above described supply pulses to control windings 30 and 30′ on alternate half cycles of the power current in the system which due to the phasing of windings 30 and 30′ tend to decrease the power supplied through the magnetic amplifier from input transformer 9–21–10 to output transformer 19–27–36.

In a similar manner parallel connected power transistors 137–141 are connected in series with control windings 23 and 31 by way of connecting leads 25, 49, 24 and 149 and through the second harmonic tuned trap circuit provided by inductor 145–146 parallel tuned by capacitor 147. These transistors (137–141) due to the connections above described supply pulses to control windings 23 and 31 on the alternate half cycles of the power current which lie between the half cycles exciting control windings 30 and 30′ and in so doing tend to increase the power supplied between input and output transformers in accordance with amplified signals applied to bases 140–144 over lead 136 from end tap 98 of transformer secondary 97. A second harmonic filter 146–147–145 is utilized to reduce second harmonic voltage from the magnetic amplifier so that it will not swamp the transistor power amplifier. Still further stabilization is provided by inductor 153 connected across windings 151 and 151′ coupled to coils 13 and 28 respectively and joined at points 152 and 154.

In operating this system described above, bridge resistors 63 and 64 are adjusted until output signals amplified and controlling the power transistors, cause equal pulses to be applied to control windings 30, 30′, 23 and 31 on alternate half cycles of power and substantially equal effects to be produced tending to increase and to decrease the power transferred through the magnetic amplifier. Now, if the line voltage increases or the load impedance increases, the bridge signals will shift in a direction to increase the amplitude of the half cycles which eventually control the gates 30 and 30′ tending to decrease the power transfer through the magnetic amplifier and to decrease the amplitude of the half cycles which control gates 23 and 31 tending also to decrease the power transfer. If the line voltage decreases or the load impedance decreases the opposite sequence results in increasing the effect of gates 23 and 31 and decreasing the effect of gates 30 and 30′ so that the magnetic amplifier passes increased power from the input transformer to the output transformer. Thus the alternating current voltage is maintained constant across the load in the presence of power line voltage changes and/or load impedance changes.

While only one form of the present invention has been shown and described, many modifications will be apparent to those skilled in the art and within the spirit and scope of the invention as set forth in particular in the appended claims.

What is claimed is:

1. In an alternating current voltage regulating system, the combination of, an input transformer for receiving alternating current power from an external source and including a center-tap and two output terminals, an output transformer including a center-tap and two input terminals and a pair of load terminals for supplying power to a load circuit, means for regulating the voltage across said load terminals including; a first saturable reactor and a rectifier connected in series between one of said output terminals and one of said input terminals, a second saturable reactor and a rectifier connected in series and in the same conductive direction between another of said output terminals and another of said input terminals, a direct connection between said center-taps, a voltage sensitive bridge coupled to said load terminals adapted to provide a directional error signal upon departure of the load voltage from a predetermined value, a plurality of current responsive control windings coupled to said saturable reactors adapted to control said saturable reactors, and an amplifier connected between said bridge and said control windings adapted to pass current through said control windings in response to said error signal in a direction tending to restore the load voltage to said predetermined value.

2. An alternating current voltage regulating system as set forth in claim 1 and including added turns on said output transformer to provide a voltage substantially greater than the voltage across said load terminals and a reactor and capacitor in series connected across said output transformer including said added turns chosen to resonate said output transformer to a predetermined alternating current source frequency.

3. An alternating current voltage regulating system as set forth in claim 1 and including a second harmonic trap circuit connected in series with at least one of said control windings for reducing second harmonic current tending to circulate in the amplifier and control winding circuits.

4. An alternating current voltage regulating system as set forth in claim 1 and including a stabilizing circuit including a reactor in series with two coils coupled to said saturable reactors.

5. An alternating current voltage regulating system as set forth in claim 1 and including two voltage sensitive non-linear resistor devices in said bridge characterized by thermal response substantially faster than the rate of alternation of the alternating current applied to said regulating system.

6. An alternating current voltage regulating system as set forth in claim 1 and including a balanced transistor stage in said amplifier.

7. An alternating current voltage regulating system as set forth in claim 1 wherein said amplifier includes a two sided power transistor output circuit, two center-tapped power supply windings and four rectifiers interconnected to supply alternate half cycle controlled pulses to said control windings in accordance with signals from said bridge.

References Cited by the Examiner

UNITED STATES PATENTS

| | | | |
|---|---|---|---|
| 2,683,853 | 7/1954 | Logan | 321—25 |
| 2,740,936 | 4/1956 | Anderson | 323—66 |

(Other references on following page)

UNITED STATES PATENTS

| | | | |
|---|---|---|---|
| 2,753,514 | 7/1956 | Muchnick | 323—66 |
| 2,768,345 | 10/1956 | Ogle et al. | 323—89 |
| 2,801,383 | 7/1957 | Comins et al. | 323—66 |
| 2,858,499 | 10/1958 | Silver | 323—89 |
| 2,946,000 | 7/1960 | Malick | 323—89 |
| 2,965,835 | 12/1960 | Gilson | 323—89 |
| 3,068,397 | 12/1962 | Perrins et al. | 323—66 |
| 3,122,701 | 2/1964 | Short et al. | 323—89 |

MILTON O. HIRSHFIELD, *Primary Examiner.*

JAMES M. THOMSON, *Examiner.*

LLOYD McCOLLUM, WARREN E. RAY, *Assistant Examiners.*